US009888437B2

(12) United States Patent
Montemurro et al.

(10) Patent No.: US 9,888,437 B2
(45) Date of Patent: *Feb. 6, 2018

(54) METHODS AND APPARATUS FOR USE IN FACILITATING ACCESS TO A COMMUNICATION SERVICE VIA A WLAN HOTSPOT

(71) Applicant: BlackBerry Limited, Waterloo (CA)

(72) Inventors: Michael Peter Montemurro, Toronto (CA); Alain Rene Gagne, Cambridge (CA); Denis Fedotenko, Waterloo (CA); Michael Knowles, Waterloo (CA); Kevin Oerton, Waterloo (CA); Liam Ronald Quinn, Kitchener (CA); Leonardo Jose Silva Salomone, Arniprior (CA)

(73) Assignee: BlackBerry Limited, Waterloo (CA)

( * ) Notice: Subject to any disclaimer, the term of this patent is extended or adjusted under 35 U.S.C. 154(b) by 144 days.

This patent is subject to a terminal disclaimer.

(21) Appl. No.: 14/930,465

(22) Filed: Nov. 2, 2015

(65) Prior Publication Data

US 2016/0057696 A1 Feb. 25, 2016

Related U.S. Application Data

(63) Continuation of application No. 12/389,584, filed on Feb. 20, 2009, now Pat. No. 9,179,399.

(Continued)

(51) Int. Cl.
*H04W 48/18* (2009.01)
*H04L 29/06* (2006.01)
(Continued)

(52) U.S. Cl.
CPC .......... *H04W 48/18* (2013.01); *H04L 63/083* (2013.01); *H04L 67/02* (2013.01); *H04L 67/26* (2013.01);
(Continued)

(58) Field of Classification Search
None
See application file for complete search history.

(56) References Cited

U.S. PATENT DOCUMENTS

| 7,197,547 B1 * | 3/2007 | Miller | G06F 17/30902 |
| | | | 709/223 |
| 7,450,940 B2 * | 11/2008 | Myers | H04L 63/0272 |
| | | | 370/397 |

(Continued)

FOREIGN PATENT DOCUMENTS

| EP | 1394988 A2 | 3/2004 |
| EP | 1788750 A1 | 5/2007 |

(Continued)

OTHER PUBLICATIONS

GSM Association, WLAN Roaming Guidelines (also known as Inter-Operator Handbook) 3.1.0, Official Document IR.61, Aug. 2004.

(Continued)

*Primary Examiner* — Hong Cho
(74) *Attorney, Agent, or Firm* — Borden Ladner Gervais LLP; Todd Keeler

(57) ABSTRACT

A mobile communication device identifies and selects a wireless local area network (WLAN) available for communications in its coverage area. Automatically, without detecting any requests made by a user via a browser application. The mobile device initiates a request (e.g. an HTTP GET request) to a predetermined server site of a communication network which is outside of the WLAN. In response to initiating the request, the mobile device receives a response message via the WLAN and identifies, from the response message, whether the request to the predetermined server site has been redirected to a redirect server site. The WLAN may be a WLAN "hotspot," where the redirect server site is a login server. The identifying may be performed by com- (Continued)

paring content from the response message to predetermined content of the predetermined server site. In response to identifying that the request has been redirected, the mobile device causes an indication to be produced at its user interface. Access to a communication service (such as a "push"-data service) may be subsequently expediently obtained.

24 Claims, 6 Drawing Sheets

Related U.S. Application Data

(60) Provisional application No. 61/052,432, filed on May 12, 2008.

(51) Int. Cl.
*H04L 29/08* (2006.01)
*H04W 76/02* (2009.01)
*H04W 84/12* (2009.01)

(52) U.S. Cl.
CPC ......... *H04L 67/2814* (2013.01); *H04W 76/02* (2013.01); *H04W 84/12* (2013.01)

(56) References Cited

U.S. PATENT DOCUMENTS

| | | | |
|---|---|---|---|
| 7,558,837 B1 | 7/2009 | Denny | |
| 9,088,416 B2 * | 7/2015 | Grigoriev | H04L 63/0428 |
| 2001/0037469 A1 | 11/2001 | Gupta et al. | |
| 2003/0088581 A1 | 5/2003 | Maze et al. | |
| 2006/0135155 A1 | 6/2006 | Chung et al. | |
| 2006/0173844 A1 | 8/2006 | Zhang et al. | |
| 2006/0174127 A1 | 8/2006 | Kalavade et al. | |
| 2006/0209773 A1 | 9/2006 | Hundal et al. | |
| 2007/0167174 A1 | 7/2007 | Halcrow et al. | |
| 2007/0238440 A1 | 10/2007 | Sengupta et al. | |
| 2007/0240202 A1 | 10/2007 | Sullivan et al. | |
| 2007/0299918 A1 | 12/2007 | Roberts | |
| 2008/0181187 A1 | 7/2008 | Scott et al. | |
| 2008/0205616 A1 | 8/2008 | Teng et al. | |
| 2009/0300722 A1 | 12/2009 | Haverinen et al. | |

FOREIGN PATENT DOCUMENTS

| | | |
|---|---|---|
| TW | 254550 B | 5/2006 |
| WO | 2004077752 A1 | 9/2004 |
| WO | 2005020002 A2 | 3/2005 |
| WO | 2006004786 A1 | 1/2006 |
| WO | 2006031927 A2 | 3/2006 |
| WO | 2006066181 A1 | 6/2006 |
| WO | 2006111951 A2 | 10/2006 |
| WO | 2007099414 A1 | 9/2007 |
| WO | 2007127162 A2 | 11/2007 |
| WO | 2008061350 A1 | 5/2008 |

OTHER PUBLICATIONS

Sellin R, "Völlig Losgeloest Der Unlicensed Mobile Access Soll Mobilfunknutzern Ein Neues Serviceerlebnis Bescheren", Net—Zeitschrift Fuer, Kommunikationsmanagement, Net—Verlagsservice, Woltersdorf DE, vol. 59, No. 4, Jan. 31, 2005, pp. 34-36.

3GPP TS 43 318, 3rd Generation Partnership Project; Technical Specification Group GSM/EDGE Radio Access Network; Generic Access Network (GAN); Stage 2 (Release 8), Feb. 2008, pp. 1-122.

Extended European Search Report for EPO application # 09153364. 6, Dec. 10, 2009.

Anton, B. et al., Best Current Practices for Wireless Internet Service Provider (WISP) Roaming, "Wireless ISP Roaming", XX, XX, 1 Feb. 1, 2003, (Feb. 1, 2003) pp. 1-37 X-P002963834.

European Patent Office, Office Action dated Jun. 1, 2010, in relation to European Patent Application No. 09153364.6 filed Feb. 20, 2009.

Mikrotikls Sia, "HotSpot Gateway", [Online], Jul. 4, 2006, Document revision 4.2, Retrieved from the Internet: URL: http://www.mikrotik.com/testdocs/ros/2.9/ip/hotspot.pdf, 28 pages.

Kamps, Stefan. European Patent Office Communication pursuant to Article 94(3) EPC dated Aug. 25, 2011, in relation to European Patent Application No. 09153364.6, 6 pages.

Chin, Allan et al. "Seamless Connectivity to Wireless Local Area Networks", Intel Technology Journal, Wireless Technologies 7(3), XP008109356, pp. 63-67, Aug. 19, 2003 (Source Date: Apr. 2, 2008).

Intel "User Guide, Intel PRO/Wireless 2915ABG Network Connection", Jun. 2005 (Source Date Mar. 3, 2008).

Plata, Edd Rianne L. United States Patent and Trademark Office Action dated Sep. 27, 2011 in relation to U.S. Appl. No. 12/389,584, 35 pages.

Plata, Edd Rianne L. United States Patent and Trademark Office Action dated Feb. 1, 2012 in relation to U.S. Appl. No. 12/389,584, 29 pages.

Plata, Edd Rianne L. United States Patent and Trademark Office Action dated Sep. 24, 2014 in relation to U.S. Appl. No. 12/389,584, 33 pages.

Plata, Edd Rianne L. United States Patent and Trademark Office Action dated Jan. 22, 2015 in relation to U.S. Appl. No. 12/389,584, 32 pages.

* cited by examiner

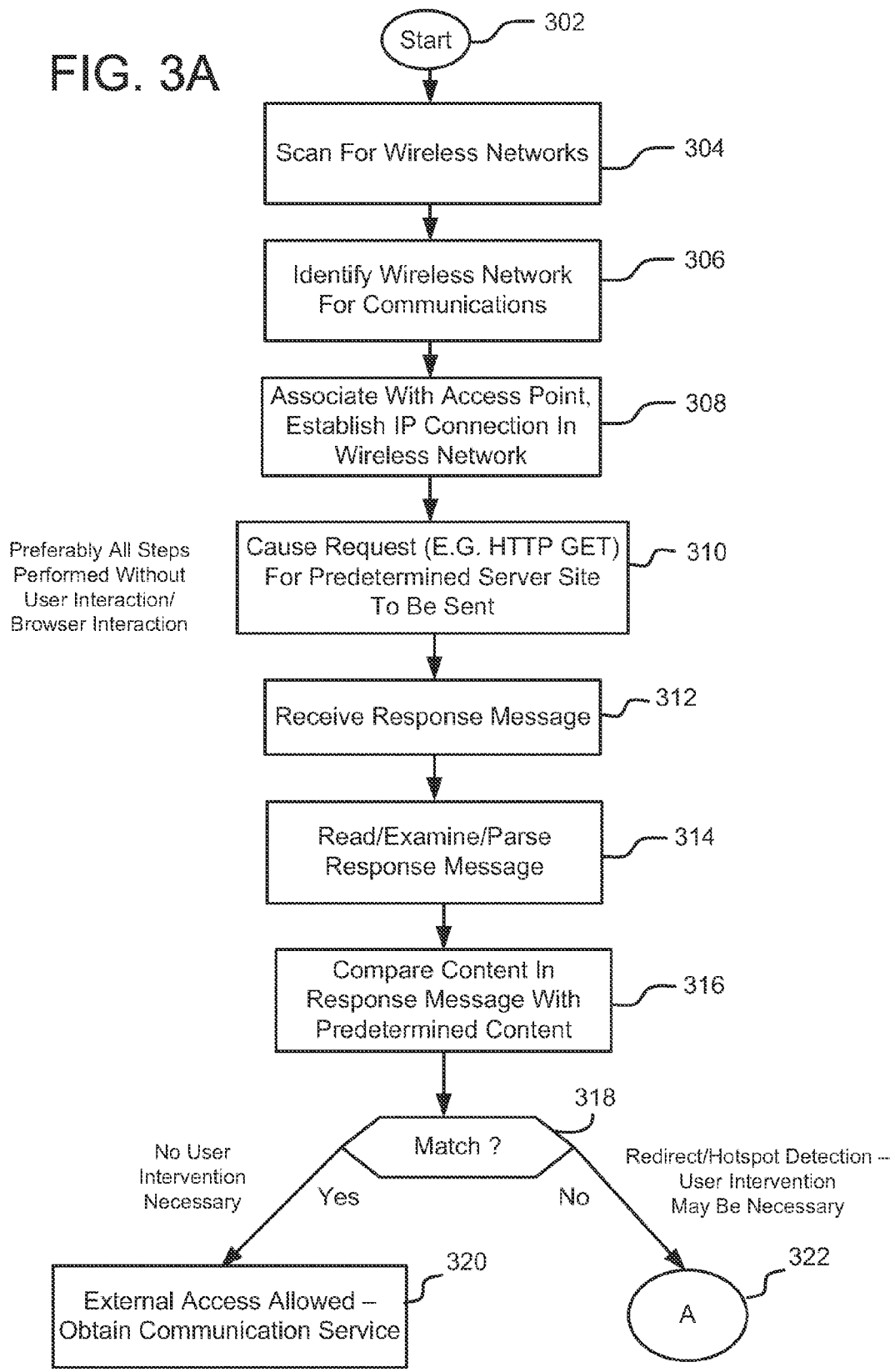

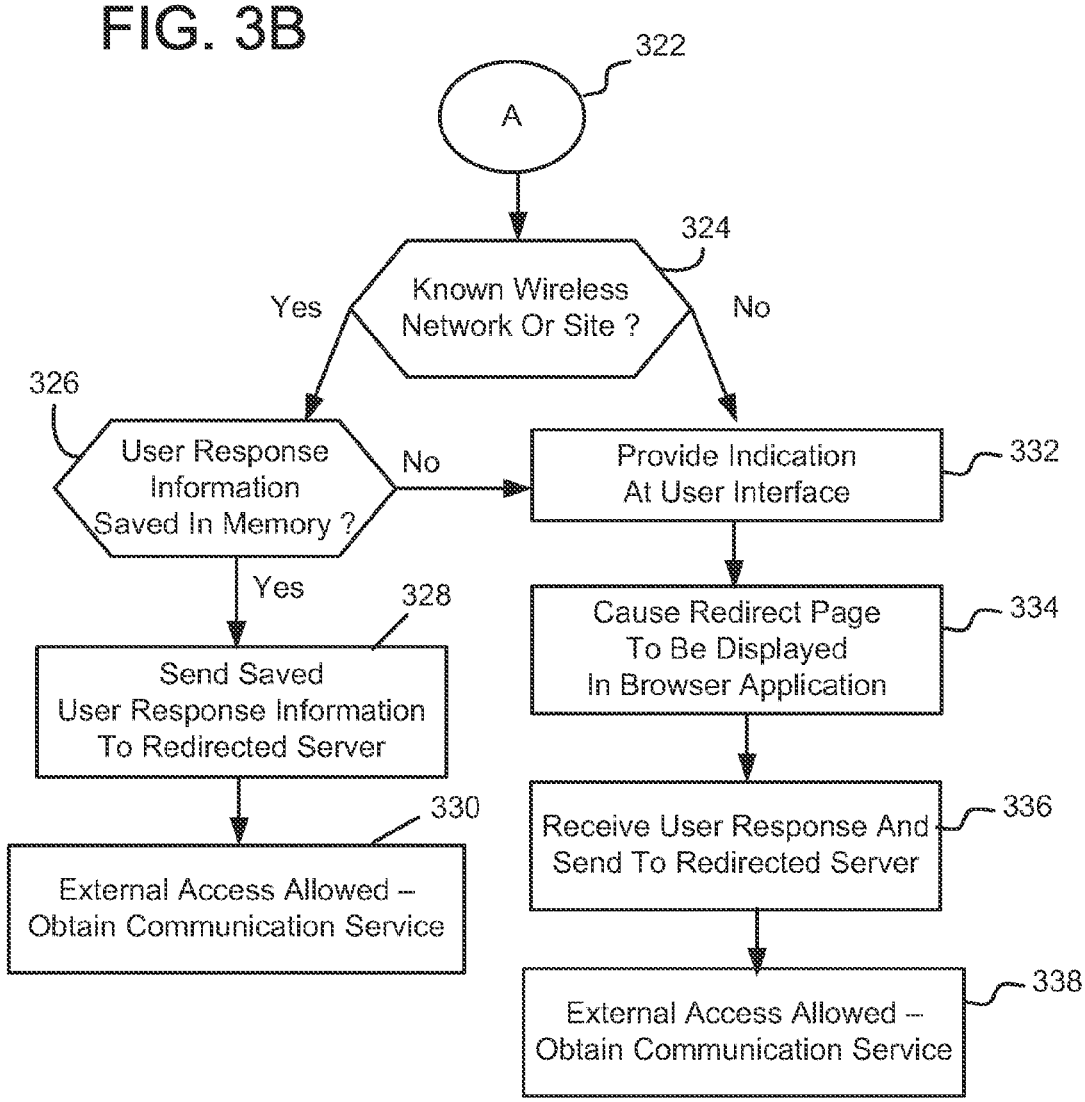

METHODS AND APPARATUS FOR USE IN FACILITATING ACCESS TO A COMMUNICATION SERVICE VIA A WLAN HOTSPOT

BACKGROUND

Field of the Technology

The present disclosure relates generally to techniques in a mobile communication device for use in facilitating access to communication services via a wireless local area network (WLAN) hotspot or similar environment.

Description of the Related Art

In wireless communication networks, such as wireless local area networks (WLANs) which operate in accordance with IEEE 802.11-based standards, a mobile communication device may obtain communication services. While being mobile, the mobile device may exit and enter into new and different WLANs. The new or unknown WLAN may be a WLAN "hotspot" which provides a captive portal, where a user login or other user response will be required prior to the mobile device obtaining any useful services via the WLAN hotspot.

For a laptop computer, this operation is typically acceptable since the user often merely intends to use and "surf" the Internet, interacting with the keyboard of the laptop computer to invoke a Web browser application when desired. When the Web browser application is opened, this request is detected, which causes a request for a server site to be submitted in order to receive data of a desired website. However, this request is redirected by the WLAN hotspot for user login, after which the mobile device will obtain service, assuming the authentication is positive.

For a handheld mobile telephony device or a handheld data communication device which utilizes a "push" data service, it has been identified that such conventional operation would not be optimal. In these types of mobile devices, the Web browser application may not be the primary application of the mobile device; rather, the primary application of the mobile device may be a voice telephony application or an e-mail message delivery application. The user is not aware that user interaction is required for user login in order to obtain such service. Therefore, once connected in a new WLAN, the mobile device may merely sit "idle", without service, where the user is unaware of the lack of service. Therefore, the mobile device connected in the WLAN will not receive any voice calls or messages otherwise intended for the mobile device unless the user interacts with the Web browser application.

Accordingly, what are needed are methods and apparatus which overcome these and other related deficiencies of the prior art. Other types of networks and devices may experience the same or similar deficiencies.

BRIEF DESCRIPTION OF THE DRAWINGS

Embodiments of present invention will now be described by way of example with reference to attached figures, wherein:

FIGS. 3A and 3B form a flowchart of a method for use in facilitating access to a voice or data communication service via a WLAN which may be a WLAN "hotspot";

DETAILED DESCRIPTION OF THE PREFERRED EMBODIMENTS

In one illustrative embodiment of the present disclosure, a mobile communication device identifies and selects a wireless local area network (WLAN) available for communications in its coverage area. In addition, the mobile device causes an IP connection to be established with the WLAN. Automatically, without detecting any requests made by a user via browser application, the mobile device then initiates a request (e.g. an HTTP GET request) to a predetermined server site of a communication network which is outside of the WLAN. In response to initiating the request, the mobile device receives a response message via the WLAN and identifies, from the response message, whether the request to the predetermined server site has been redirected to a redirect server site. The WLAN may be a public WLAN "hotspot," where the redirect server site is a login server. The identification may be performed by comparing content from the response message to predetermined content of the predetermined server site. In response to identifying that the request has been redirected, the mobile device causes an indication to be produced at its user interface (e.g. an audible alert, a visually-displayed message, a visually-displayed indicator on the "home" screen of the mobile device, the redirect server page itself, or combinations of the above). This way, the user is proactively informed of the need for a user response (e.g. a user registration or login), so that access to a communication service may be subsequently expediently obtained via the hotspot. The communication service may be a non-user-initiated communication service, such as one for receiving data via a "push" data service, or for receiving voice calls via a voice telephony service.

Figure 1:
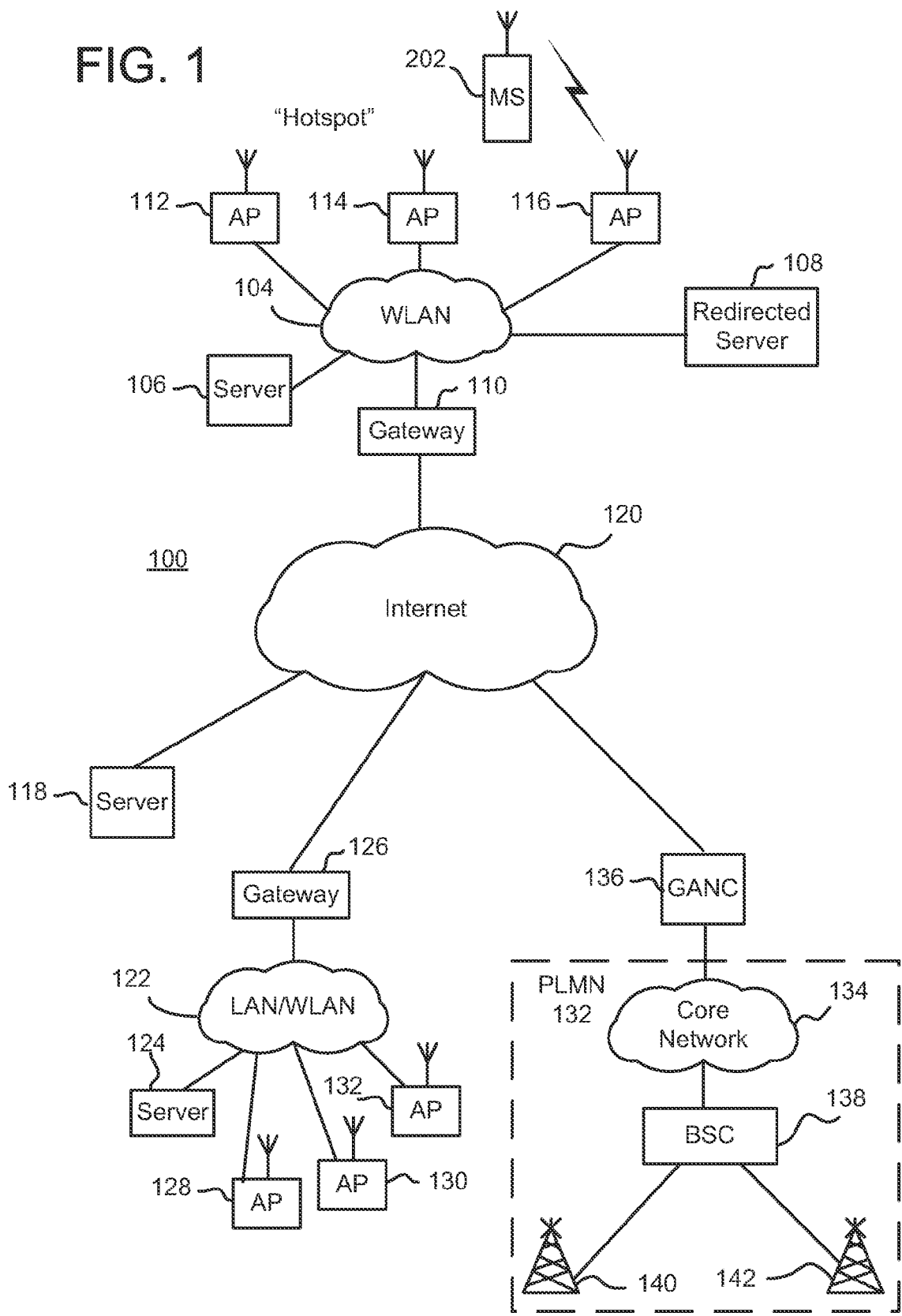
FIG. 1 is an illustrative representation of a communication system having a wireless local area network (WLAN), which may be a WLAN "hotspot," within which a mobile communication device may operate.

To illustrate general network architecture, FIG. 1 is an illustrative representation of a communication system 100 having a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 104 is a private communication network of an enterprise (small company, corporation, etc.) associated with mobile device 202.

Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques. Note that some communication applications utilized by terminals, such as VoIP applications, require the use of SIP. SIP is well-documented in standard documents such as Request For Comments (RFC) 3261. For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

For devices attempting to access WLAN 104 via Internet 110, gateway 110 is configured to permit or deny internal access to the data, applications, and/or functionality in WLAN 104. For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

When a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). The user will enter a user response via the Web browser application, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

For devices attempting to access WLAN 122 via Internet 120 (e.g. through WLAN 104), gateway 110 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered by WLAN 122 depending on whether or not a device has been authorized and what access rights are given upon authorization.

Note further that, using Generic Access Network (GAN) based technologies, mobile device 202 may also access communication services from a core network 134 of a Public Land Mobile Network (PLMN) 132 (e.g. cellular), as will be described in more detailed later below.

Figure 2:
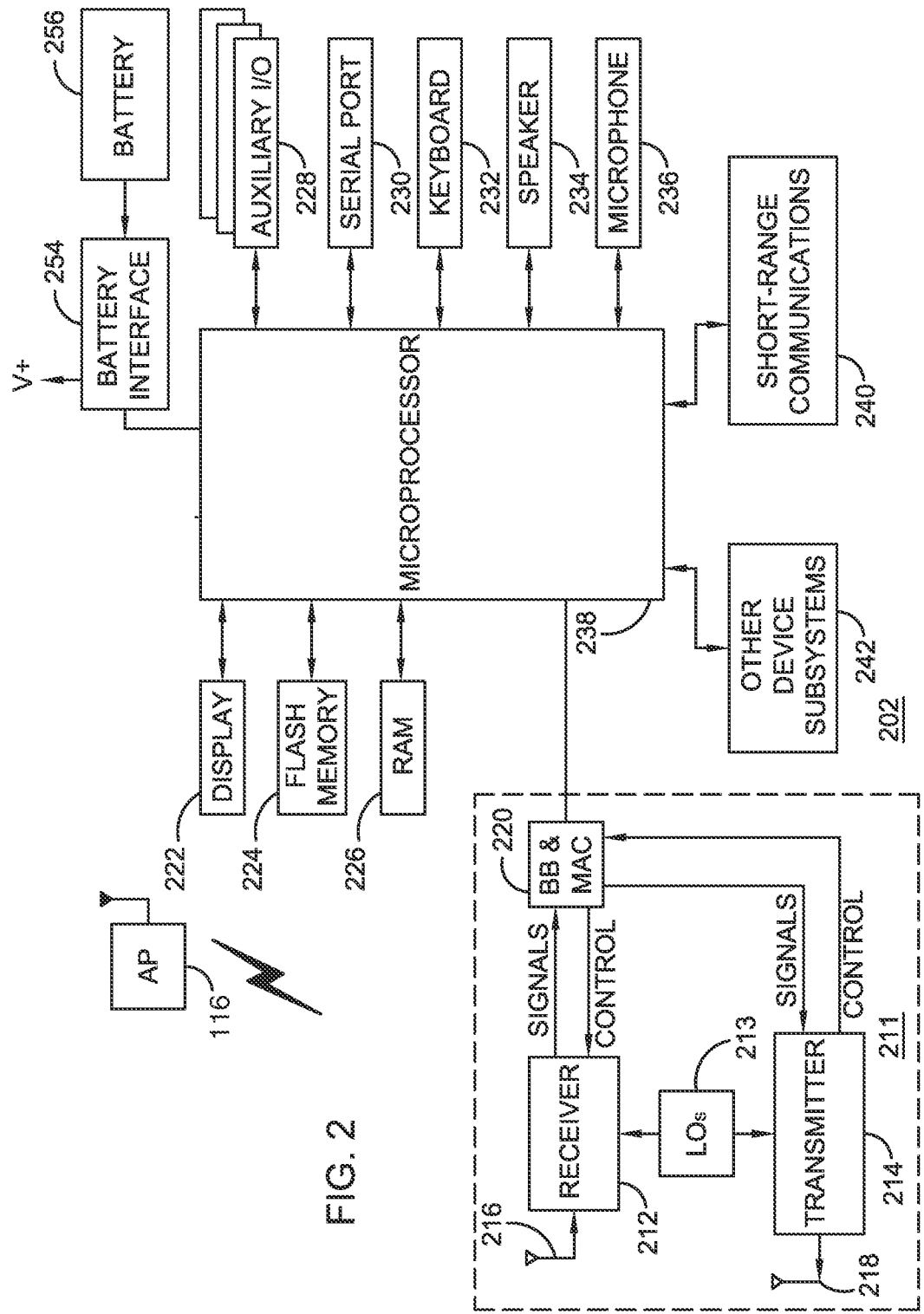
FIG. 2 is a schematic block diagram of the mobile communication device of FIG. 1 which may operate in a WLAN of FIG. 1.

Referring now to FIG. 2, electrical components of a typical mobile communication device 202 (e.g. a mobile station) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of WLAN 104 of FIG. 1. For communication with AP 190, mobile device 202 utilizes communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including at least data and/or voice communication applications, will normally be installed on mobile device 202 during its manufacture. This includes the inventive techniques of the present disclosure. For this reason, microprocessor 238 may enable execution of a Web browser application (see e.g. the discussion in relation to FIGS. 4-5) with enhanced hotspot-detection capabilities. The techniques of the present disclosure, however, need not be incorporated as part of the Web browser application, as long as outgoing requests and incoming responses are made in accordance with the techniques described in relation to FIGS. 3A-3B (described later below).

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. In accordance with the present techniques, microprocessor 238 may process outgoing message requests and incoming responses described later in relation to FIGS. 3A-3B, whether or not such processing is part of the Web browser application. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 4:
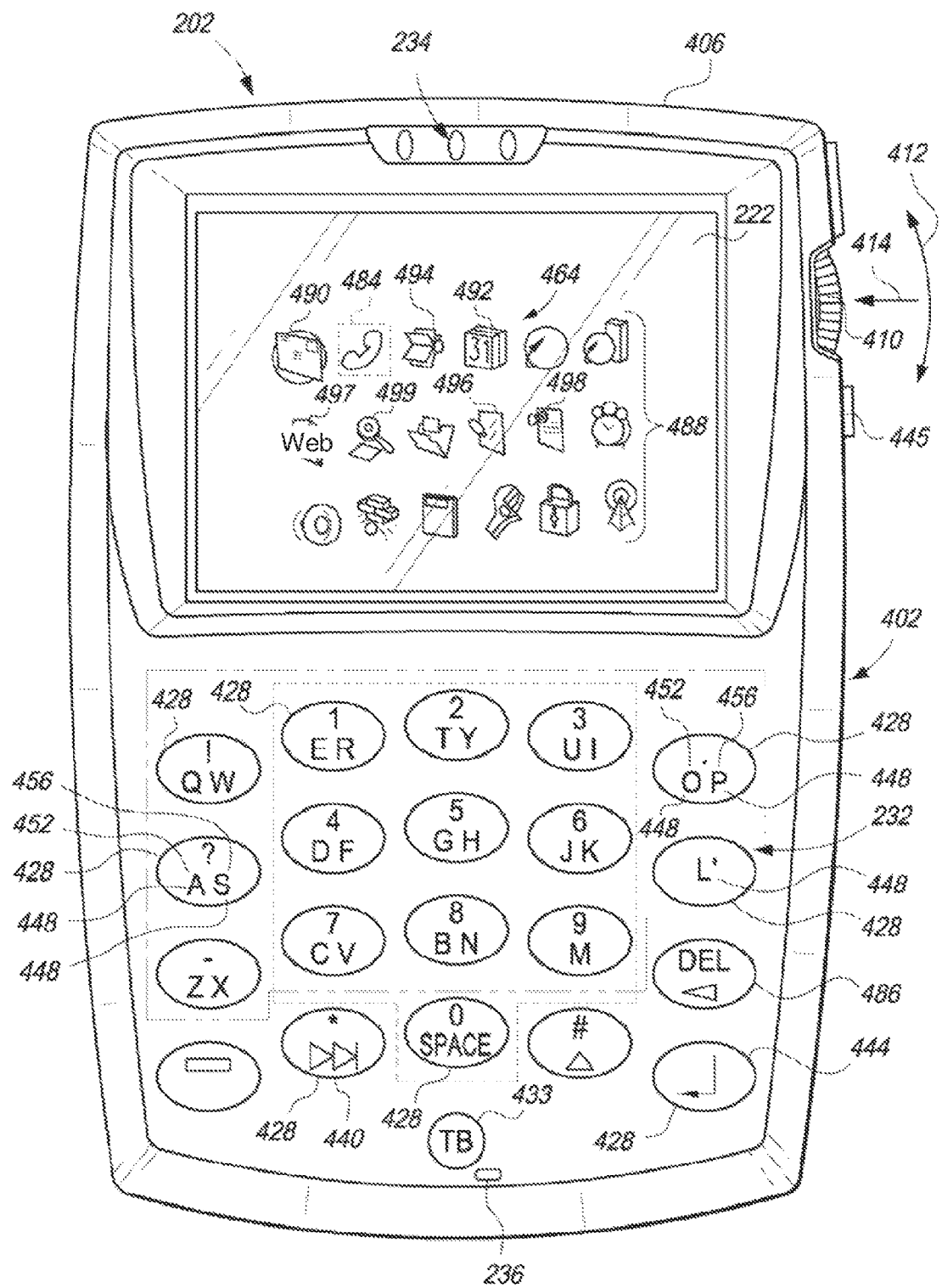
FIG. 4 is an illustrative example of an exemplary user interface of the mobile communication device of FIGS. 1 and 2.

Referring ahead now to FIG. 4, what is shown is an illustrative representation of an exemplary user interface 402 of mobile device 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
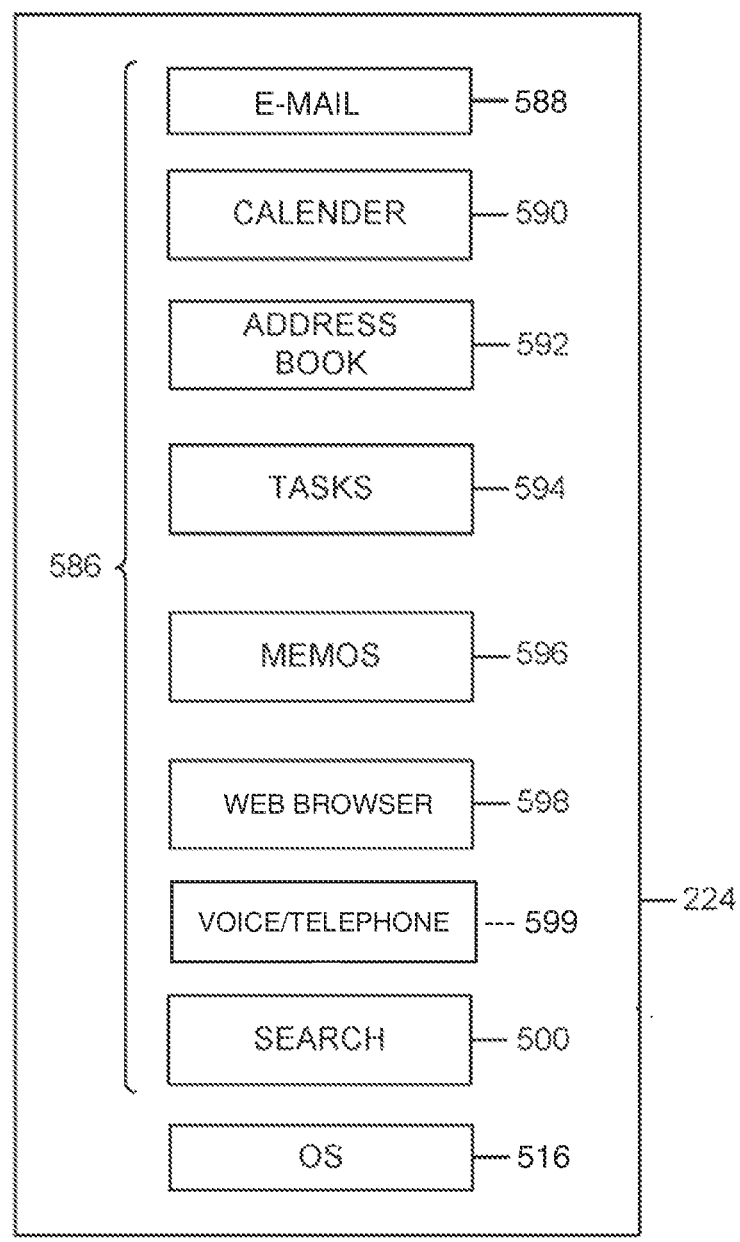
FIG. 5 is an illustrative representation of memory of the mobile communication device which includes a plurality of applications associated with communication services.

As shown further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

In FIG. 4, the "home" screen output is shown as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the wireless network described is a WLAN, any suitable wireless network may be utilized. The mobile device may additionally or alternatively operate for communications via a cellular telecommunications network (e.g. GSM/GPRS, or CDMA).

Referring back to the environment of FIG. 1, it is noted that mobile device 202 may exit and enter into new and different WLANs during its operation. The new or unknown WLAN may be WLAN 104 which is a "hotspot" (e.g. providing a captive portal), where a user registration or login or other user response will be required prior to mobile device 202 obtaining any useful services via the WLAN hotspot. The "walled garden" of the hotspot prohibits such access. Note that for a laptop computer, this operation is typically acceptable since the user often merely intends to use and "surf" the Internet, interacting with the keyboard of the laptop computer to invoke the Web browser application when desired. When the Web browser application is opened, it causes a request for server 118 (for example) to be submitted in order to receive data of the desired website. This request is typically redirected by WLAN 104 for user registration or login, after which the laptop computer will obtain service, assuming the authentication is positive.

If mobile device 202 is a handheld mobile telephony device or a handheld data communication device which utilizes a "push" data service, however, it has been identified that such conventional operation typically associated with laptop computers is not optimal. The Web browser application may not be the primary application of the mobile device 202; rather, the primary application of mobile device 202 may be a voice telephony application or an e-mail message delivery application (see e.g. FIG. 5). In this case, the user is not aware that user interaction is required for user registration or login in order to obtain such service. Therefore, once connected in (a new or unknown) WLAN 104, mobile device 202 may merely sit "idle", without service, where the user is unaware of the lack of service. Therefore, mobile device 202 connected in WLAN 104 will not receive any voice calls or messages otherwise intended for mobile device 202 unless the user interacts with the Web browser application. Other types of networks and devices may experience the same or similar deficiencies.

Thus, FIGS. 3A and 3B form a flowchart of a method for use in facilitating access to a voice or data communication service via a WLAN which may be a WLAN "hotspot." Such technique may overcome prior art deficiencies and other related deficiencies in these and other environments. The method of FIGS. 3A-3B may be performed by the mobile device described in relation to FIGS. 1, 2, 4, and 5. In particular, the techniques described in relation to the flowchart may be performed by one or more processors of the mobile device along with its wireless transceiver. A computer program product which may embody the technique may include a computer readable medium having computer instructions stored therein which are executable by the one or more processors of the mobile device for performing the technique. In the follow description, the mobile device and wireless network generally operate in accordance with IEEE 802.11 standards, and therefore the appropriate IEEE 802.11 related standards apply where applicable.

The steps described in relation to FIG. 3A are preferably performed without any user interaction at a user interface of the mobile device (e.g. without detecting any requests made by a user via the Web browser application of the mobile device). Beginning at a start block 302 of FIG. 3A, the mobile device operates its RF or wireless transceiver to perform a scanning operation in search for a plurality of wireless networks within its coverage range (step 304 of FIG. 3A). The scanning may be active scanning (e.g. where probe requests are submitted by the mobile device and probe responses are received in response) or passive scanning. Subsequently, the mobile device identifies (step 306 of FIG. 3A) and selects (step 308 of FIG. 3A) a wireless network available for communications. The mobile device may attempt to utilize prestored wireless network "profiles" which have a plurality of known network identifications (e.g. SSIDs or ESSIDS); however, the wireless network identified may or may not be a known network to the mobile device. The wireless network may be WLAN 104 described in relation to FIG. 1. The mobile device "associates" with the selected wireless network, and causes an IP connection to be established as well (step 308 of FIG. 3A). Thus, the mobile device is associated with and identifiable by an IP address, which may have been assigned by a dynamic host configuration protocol (DHCP) server of the wireless network.

The mobile device then initiates a request to a predetermined server site of a communication network which is outside of the wireless network (step 310 of FIG. 3A). This step is initiated automatically, without detection of any requests made by the user via the Web browser application. The request may be a Hypertext Transfer Protocol (HTTP) request and, in particular, a HTTP GET request. A predetermined Uniform Resource Locator (URL) which identifies the predetermined server site may be utilized in this request. For example, the URL may be in the form of http://www.google.com or http://www.yahoo.com. This URL may be different from the default or user-set URL provided in the Web browser application, and may be utilized by the mobile device exclusively for this described step. Note that the request may be in the form of any suitable message having a predetermined address or URL. The server site may be, for example, server 118 or server 124 of FIG. 1 which are communicable via gateway 110.

In response to initiating the request, the mobile device receives a response message via the wireless network (step 312 of FIG. 3A). The mobile device then reads the response message, examining and parsing the same (step 314 of FIG. 3A). In particular, the mobile device compares the content of the response message with predetermined content which is stored in memory of the mobile device (step 316 of FIG. 3A). If there is a match, it is determined that external access outside of the wireless network has been allowed and that no user intervention is necessary, at least with respect to the requirements of the wireless network (step 320 of FIG. 3A). The mobile device may then perform operations, conventional or otherwise, in order to obtain the communication services which reside outside of the wireless network (via the network's gateway, such as gateway 110 of FIG. 1).

If there is no match in step 318, however, it is determined that the request has been redirected to a redirected server site, and that the wireless network is a "hotspot" (see connector 322 ("A"). Immediate external access outside of the wireless network has been denied or suspended, at least until further processing is performed via connector 322 to FIG. 3B. The request may have been redirected to a redirected server site which may solicit a user registration, a user login, a user payment, or a user acceptance of terms of use, a license, or a legal disclaimer, as examples.

For steps 314, 316, and 318 of FIG. 3A, in one embodiment, the predetermined content is predetermined content associated with and "known" of the predetermined server site. The predetermined content may be from a server site which is owned and/or controlled by a manufacturer, operator, or provider of the communication service of the mobile device. If the comparison(s) indicate a match, then it is deemed that access to this external server site was granted and no user response is required; if the comparison(s) fail to indicate a match, then it is deemed that the request has been redirected to some other site. As an example, the predetermined server site may be enabled with a predetermined cookie and the comparison(s) involves comparing any cookies received in the response message with a stored identification of the predetermined cookie. Alternatively, or in combination of the above, the content of the predetermined server site includes one or more predetermined text strings, and the comparison(s) involves comparing one or more text strings received in the response message with the one or more stored predetermined text strings. However, any content in the response message may be compared in this fashion for these purposes.

In another embodiment, the predetermined content is predetermined content expected or anticipated from a redirect server site. As described earlier, the request may have been redirected to a redirected server site which may solicit a user registration, a user login, a user payment, or a user acceptance of terms of use, a license, or a legal disclaimer, as examples. Thus, comparisons based on such text strings ("login", "registration", "payment", "accept", "decline", "license", "legal", hotspot login URL, etc.) would be appropriate. If the comparison(s) indicate a match to known content to be at such redirect server sites, it is deemed that the request has been redirected to such redirect server site. If the comparison(s) indicate a failure to match such known content, then it is deemed that access to the external server site was granted and no user response is required. Note that combinations of comparisons of content of the predetermined server site and of the expected redirect server site may be appropriate as well.

Illustrating by example, if the response message is a SIP 200 OK message which does not have a predetermined "magic" cookie provided at the predetermined server site, the mobile device may search for a hotspot login URL for identification of redirection. If the mobile device receives 302 HTTP code (this is indicative of page redirect), it may parse its metatags and extract a hotspot login URL for identification of redirection. In addition, the mobile device may receive a HTTP header message which contains a tag of "META REFRESH" which is indicative of page redirection (e.g. <META HTTP-EQUIV="refresh" content="2; URL=http//www.yoursite.com/newpage.htm"). Further, the mobile device may search for embedded XML in the response message to identify whether a login in accordance with Wireless Internet Service Provider Roaming (WISPr) is supported, and parse the HTML data looking for a hotspot login URL.

Beginning at connector 322 ("A") in FIG. 3B, where it is deemed that the wireless network is a hotspot, the mobile device identifies whether the wireless network is known (i.e. known in advance, or previously been encountered and utilized successfully) or that the response message identifies a known website (i.e. known in advance, or previously been encountered and utilized successfully) (step 324 of FIG. 3B). This may be performed by comparing the identifier/address with stored predetermined identifier(s)/address(es). If so, the "YES" branch from step 324 is taken where the mobile device identifies whether user response information is saved in memory in association with the identifier of the wireless network (e.g. SSID or ESSID) or website (step 326 of FIG. 3B). If user response information is saved, that may mean that the wireless network may have been previously encountered by the mobile device and the user has already manually submitted (i.e. via the Web browser application) a user response which has been saved. If yes in step 326, the mobile device causes the saved user response information to be sent to the redirected server (step 328 of FIG. 3B).

Per the WISPr specification, the user login may be performed without the Web browser application being opened where the user credentials are stored in a network profile. In one embodiment, the mobile device operates to display a user prompt for the user to accept prior to submitting these credentials in step 328. If a wizard application is utilized in the mobile device, the mobile device operates to display a button to launch the Web browser application to register, or the Web browser application may be automatically opened.

Assuming that the user response information is sufficient, as determined by the redirect server or wireless network, external access outside of the wireless network has been allowed (step 330 of FIG. 3B) and no user intervention is necessary, at least with respect to the requirements of the wireless network. The mobile device may then perform operations, conventional or otherwise, in order to obtain the communication services which reside outside of the wireless network.

If the mobile device identifies that the wireless network or redirected website is unknown in step 324, however, then the mobile device performs operations pursuant to the "NO" branch from step 324. Here, the mobile device deems the wireless network to be a "hotspot" (e.g. having a captive portal) where no information is available to otherwise operate autonomously to access the desired communication service. In this case, the mobile device causes an indication to be produced at its user interface (step 332 of FIG. 3B). The indication may be or include an audible alert, a vibrating alert, a visually-displayed message, a visually-displayed indicator on the home screen of the mobile device (i.e. provided only when the condition is met, but otherwise not so provided), the redirect server page itself, or other suitable indication, or any combination of the above. In one embodiment, the indication is or includes an audible and/or vibrating alert. This action may solicit the user to interact with the Web browser application or the user interface.

In one embodiment, the mobile device may automatically (without user intervention) invoke or open the Web browser application on behalf of the user, or the user may be instructed by message to open the Web browser application. In this case, the redirect page is displayed in the Web browser application (step 334 of FIG. 3B). Note that the mobile device may alternatively display a user prompt for the user for the user response, without use of the Web browser application.

The user then interacts with the user interface (e.g. Web browser) and enters the proper response. As described earlier, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). The user may enter a user response via the Web browser application, or other user prompt, which is received and thereafter sent by the mobile device to the redirect server for consideration (step 336 of FIG. 3B). The redirect server receives this information and identifies whether the user response is sufficient (e.g. whether the user name and password match prestored user name and password information, whether the user payment is accepted, whether the user acceptance is confirmed, etc.). If the user response is deemed sufficient, the wireless network permits access to the data, applications, and/or functionality in or outside of the wireless network (step 338 of FIG. 3B).

As described, the user may be proactively informed of the need for a user response, so that access to a preferred communication service may be subsequently expediently obtained via the hotspot. This is especially helpful when the preferred communication service for the mobile device is a non-user-initiated communication service, such as one for receiving data via a "push" data service or for receiving voice calls via a voice telephony service.

As described earlier, the mobile device may obtain access to communication services outside of the wireless network once properly authenticated using the techniques described. Note that the communication service which may be accessed may be or include a communication service provided via Generic Access Network (GAN) based technology. GAN technology may provide, amongst other things, a voice communication service for mobile device 202 via the WLAN hotspot. Referring back to FIG. 1, PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 136 of PLMN 132 may be facilitated through a suitable connecting network such as a broadband, wide-area IP communication network (e.g. the Internet 120) or any suitable public or private wide area network. Gateway/controller or GAN controller (GANC) 142 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided.

Again, GANC 136 operates in accordance with GAN based technology (formerly known as Unlicensed Mobile Access (UMA), and may be or include GANC 136 (formerly known as UMA Network Controller or UNC) or the like. In this case, terminals including mobile device 202 are enabled with GAN technology for operating in a GAN mode of operation. GAN methodologies are known and described in publicly available documentation. Mobile device 202 with GAN-enabled, dual-mode operation may be within operating range of WLAN 104 for communications. Upon connecting, mobile device 202 contacts GANC 136, via WLAN 104 and the Internet 120, to be authenticated and authorized to access voice and data communication services of core network of PLMN 132. If approved, the subscriber's current location information is stored in core network 134 of PLMN 132 and, from that point on, all voice and data traffic for mobile device 202 is routed to the device via WLAN 104, in contrast to a radio access network (RAN) of PLMN 132 which includes BSC 138 and BSs 140 and 142. In this state, mobile device 202 is operating in a GAN mode of operation. When a call is established for mobile device 202 while operating within WLAN 104, the call connection for the call is routed within core network 134 but RF resources of WLAN 104 are utilized.

In this embodiment specifically, WLAN 104 is operable as a broadband IP-based access network providing access to the well-known A/Gb interfaces of PLMN 132, wherein GANC 136 is a network node coupled to WLAN 104 via an Up reference point interface. See e.g. Third Generation Partnership Project (3GPP) Technical Specification (TS) 43.318. As provided for in such specification documents, the Up reference point defines the interface between GANC 136 and mobile device 202. Where the WLAN 104 and GANC 136 are operable to co-exist with the GSM/Enhanced Data Rates for GSM Evolution (EDGE) RAN (GERAN) infrastructure, GANC 136 interconnects to the core network 134 of PLMN 132 via the same A/Gb interfaces used by a standard GERAN Base Station Subsystem (BSS) network element. Accordingly, the functionality of GANC 136 includes necessary protocol interworking so as to emulate the functionality of the GERAN BSS. An A-interface defines the interface for GSM-based circuit-switched (CS) services and is disposed between GANC 136 and a Mobile Switching Center (MSC) of PLMN 132. A Gb-interface defines the interface for GPRS-based packet-switched (PS) services and is disposed between GANC 136 and Serving GPRS Support Node (SGSN) (not shown in FIG. 1) of PLMN 132. A Security Gateway (SGW) may also be included in GANC 136 that is interfaced via a Wm reference point with an Authentication, Authorization and Accounting (AAA) proxy/server node disposed in PLMN 132, wherein a Home Location Register (HLR) is operably coupled to AAA node.

In operation, WLAN 104 and GANC 136 appears to core network 136 of PLMN 104 as a GERAN BSS network element by mimicking the role of the BSC in the GERAN architecture as seen from the perspective of the A/Gb interfaces. Accordingly, transparency exists between core network 134 of PLMN 132 and the underlying radio access technologies supported by GANC 136, which are different from the radio access supported by BSC 138. As described earlier, WLAN 104 is disposed between generic access (GA)-enabled mobile device 202 and GANC 136 may be effectuated by a suitable broadband IP network (Internet 120). The overall functionality provided by GANC 136 includes user plane circuit-switched (CS) services, user plane packet-switched (PS) services, and control plane functionality. User plane CS services typically involve interworking CS bearers over the Up interface to CS bearers over the A-interface, including appropriate transcoding of voice to/from UE and PCM voice from/to the MSC. The user plane PS services typically involve interworking data transport channels over the Up interface to packet flows over the Gb interface. The control plane functionality typically includes (i) SGW for the set-up of secure tunnel with UE for mutual authentication, encryption and data integrity; (ii) registration for GAN service access and providing system information; (iii) set-up of GAN bearer paths for CS and PS services (e.g. establishment, management, and teardown of signaling and user plane bearers between mobile device 202 and GANC 136); and (iv) GAN functional equivalents to GSM paging and handovers.

Note that mobile device 202 may also be a wireless handset of the dual-mode type, having both WLAN and cellular (WWAN) radio interfaces. Thus, mobile device 202 may access services of core network 134 of PLMN 132 with use of its cellular radio interface, as well as access services via WLANs with use of its WLAN radio interface.

As described herein, a mobile communication device of the present disclosure identifies and selects a wireless local area network (WLAN) available for communications in its coverage area. The mobile device causes an IP connection to be established with the WLAN. Automatically, without detecting any requests made by a user via a browser application, the mobile device then initiates a request (e.g. an HTTP GET request) to a predetermined server site of a communication network which is outside of the WLAN. In response to initiating the request, the mobile device receives a response message via the WLAN and identifies, from the response message, whether the request to the predetermined server site has been redirected to a redirect server site. The WLAN may be a public WLAN "hotspot," where the redirect server site is a login server. The identification may be performed by comparing content from the response message to predetermined content of the predetermined server site. In response to identifying that the request has been redirected, the mobile device causes an indication to be produced at its user interface. This way, the user is proactively informed of the need for a user response (e.g. a user registration or login), so that access to a communication service may be subsequently expediently obtained via the hotspot. The communication service may be a non-user-initiated communication service, such as one for receiving data via a "push" data service or for receiving voice calls via a voice telephony service.

The above-described embodiments of the present disclosure are intended to be examples only. Those of skill in the art may effect alterations, modifications and variations to the particular embodiments without departing from the scope of the application. Although the description of the architecture for FIG. 1 relates to a specific example for illustration, where the WLAN is an IEEE 802.11-based network, different environments may be applicable as well. The wireless network may be a Bluetooth-based network, a WiMAX-based network (i.e. IEEE 802.16), or a Ultra-WideBand (UWB)-based network (i.e. IEEE 802.15), as a few examples. The invention described herein in the recited claims intends to cover and embrace all suitable changes in technology.

The invention claimed is:

1. A method in a communication device comprising the acts of:
   identifying and selecting a wireless communication network available for communications in a coverage area of the communication device;
   causing a connection to be established with the wireless communication network;
   automatically:
      initiating a request to a predetermined server site external to the wireless communication network;
      receiving a response message in response to initiating the request; and
      identifying at the communication device, from the response message, whether the request to the predetermined server site has been redirected to a redirect server site of the wireless communication network, wherein the identifying whether the request has been redirected comprises:
         comparing a content in the response message with a predetermined content associated with the predetermined server site; and
         in response to identifying, at the communication device, a match between the content in the response message and the predetermined content associated with the predetermined server site, identifying at the communication device that the request to the predetermined server site has not been redirected.

2. The method of claim 1, further comprising:
   in response to identifying, at the communication device, that the content in the response message fails to match the predetermined content associated with the predetermined server site, identifying at the communication device that the request to the predetermined server site has been redirected;
   causing an indication to be produced in response to identifying that the request has been redirected;
   after causing the indication to be produced: receiving, at a user interface, a user response;
   causing the user response to be sent to the redirect server site; and
   obtaining access to a voice or a data communication service after causing the user response to be sent.

3. The method of claim 2, wherein the voice or data communication service comprises at least one of:
   a push-type data communication service;
   a data or message synchronization service;
   an e-mail message synchronization service; and
   a voice communication service provided via a generic access network (GAN) controller (GANC).

4. The method of claim 1, further comprising:
   in response to identifying, at the communication device, that the content in the response message fails to match the predetermined content identifying at the communication device that the request has been redirected;
   causing a user prompt associated with the redirect server site to be displayed via a browser application;

receiving, via a user interface, user information in response to displaying the user prompt;
causing the user information to be sent to the redirect server site; and obtaining access to a voice or a data communication service after causing the user information to be sent to the redirect server site.

5. The method of claim 4, further comprising:
saving, in memory, the user information in association with an identifier of the wireless communication network;
for subsequent connections with the wireless communication network: reading the user information from the memory;
causing the user information to be sent to the redirect server site; and
obtaining access to a voice or a data communication service after causing the user information to be sent to the redirect server site.

6. The method of claim 1, further comprising:
in response to identifying, at the communication device, that the content in the response message fails to match the predetermined content associated with the predetermined server site, identifying at the communication device that the request to the predetermined server site has been redirected;
causing an indication to be produced in response to identifying that the request has been redirected;
after causing the indication to be produced: causing a user disclaimer or acceptance prompt associated with the redirect server site to be displayed via a browser application;
receiving, via the user interface, a user acceptance in response to displaying the user disclaimer or acceptance prompt;
causing the user acceptance to be sent to the redirect server site; and
obtaining access to a voice or a data communication service after causing the user acceptance to be sent to the redirect server site.

7. The method of claim 1, wherein the act of identifying whether the request has been redirected comprises the further act of:
identifying whether a predetermined cookie is found in the response message.

8. The method of claim 1, wherein the act of identifying whether the request has been redirected comprises the further act of:
identifying whether one or more predetermined text strings are found in the response message.

9. A non-transitory computer readable medium having stored thereon computer instructions executable by one or more processors of a communication device for performing the method of claim 1.

10. The method of claim 1, wherein the request is sent to a gateway of the wireless communication network.

11. A communication device, comprising:
one or more processors;
a wireless transceiver coupled to the one or more processors; a user interface coupled to the one or more processors; the one or more processors being operative to:
identify, via the wireless transceiver, a wireless communication network available for communications in a coverage area of the communication device;
cause a connection to be established with the wireless communication network;
automatically:
transmit, via the wireless transceiver, a request to a predetermined server site external to the wireless communication network;
receive, via the wireless transceiver, a response message in response to transmitting the request;
identify at the communication device, from the response message, whether the request to the predetermined server site has been redirected to a redirect server site of the wireless communication network, by:
comparing a content in the response message with a predetermined content associated with the predetermined server site; and
in response to identifying, at the communication device, a match between the content in the response message and the predetermined content associated with the predetermined server site, identifying at the communication device that the request to the predetermined server site has not been redirected.

12. The communication device of claim 11, wherein the one or more processors are further operative to:
in response to identifying, at the communication device, that the content in the response message fails to match the predetermined content associated with the predetermined server site, identify at the communication device that the request to the predetermined server site has been redirected;
cause an indication to be produced in response to identifying that the request has been redirected;
receive, at the user interface, a user response;
cause the user response to be sent, via the wireless transceiver, to the redirect server site; and
obtain access to the voice or the data communication service after causing the user response to be sent.

13. The communication device of claim 11, wherein the one or more processors are further operative to:
in response to identifying, at the communication device, that the content in the response message fails to match the predetermined content associated with the predetermined server site, identify at the communication device that the request to the predetermined server site has been redirected;
cause a user prompt associated with the redirect server site to be displayed in the user interface via a browser application;
receive, via the user interface, user information in response to displaying the user prompt;
cause the user information to be sent, via the wireless transceiver, to the redirect server site; and
obtain access to the voice or the data communication service after causing the user information to be sent to the redirect server site.

14. The communication device of claim 13, wherein the one or more processors are further operative to:
save, in memory, the user information in association with an identifier of the wireless communication network;
for subsequent connections with the wireless communication network: read the user information from the memory;
cause the user information to be sent, via the wireless transceiver, to the redirect server site; and
obtain access to the voice or the data communication service after causing the user login information to be sent to the redirect server site.

15. The communication device of claim 11, wherein the one or more processors are further operative to:

in response to identifying, at the communication device, that the content in the response message fails to match the predetermined content associated with the predetermined server site, identify at the communication device that the request to the predetermined server site has been redirected;

cause a user disclaimer or acceptance prompt associated with the redirect server site to be displayed in the user interface via a browser application;

receive, via the user interface, a user acceptance in response to displaying the user disclaimer or acceptance prompt;

cause the user acceptance to be sent, via the wireless transceiver, to the redirect server site; and obtain access to the voice or the data communication service after causing the user acceptance to be sent to the redirect server site.

16. The communication device of claim 11, wherein the one or more processors are further operative to identifying whether the request has been redirected by one of:

identifying whether a predetermined cookie is found in the response message; and identifying whether one or more predetermined text strings are found in the response message.

17. A method in a communication device comprising the acts of:

identifying and selecting a wireless communication network available for communications in a coverage area of the communication device;

causing a connection to be established with the wireless communication network;

automatically:

initiating a request to a predetermined server site external to the wireless communication network;

receiving a response message in response to initiating the request; and identifying at the communication device, from the response message, whether the request to the predetermined server site has been redirected to a redirect server site of the wireless communication network, wherein the identifying whether the request has been redirected comprises:

comparing a content in the response message with a predetermined content associated with the predetermined server site; and in response to identifying, at the communication device, a mismatch between the content in the response message and the predetermined content associated with the predetermined server site, identifying at the communication device that the request to the predetermined server site has been redirected.

18. The method of claim 17, further comprising:

causing an indication to be produced in response to identifying that the request has been redirected;

after causing the indication to be produced: receiving, at a user interface, a user response;

causing the user response to be sent to the redirect server site; and obtaining access to a voice or a data communication service after causing the user response to be sent.

19. The method of claim 17, further comprising:

causing a user prompt associated with the redirect server site to be displayed via a browser application;

receiving, via a user interface, user information in response to displaying the user prompt;

causing the user information to be sent to the redirect server site; and obtaining access to a voice or a data communication service after causing the user information to be sent to the redirect server site.

20. The method of claim 19, further comprising:

saving, in memory, the user information in association with an identifier of the wireless communication network;

for subsequent connections with the wireless communication network: reading the user information from the memory;

causing the user information to be sent to the redirect server site; and obtaining access to a voice or a data communication service after causing the user information to be sent to the redirect server site.

21. The method of claim 17, further comprising:

causing an indication to be produced in response to identifying that the request has been redirected;

after causing the indication to be produced: causing a user disclaimer or acceptance prompt associated with the redirect server site to be displayed via a browser application;

receiving, via the user interface, a user acceptance in response to displaying the user disclaimer or acceptance prompt;

causing the user acceptance to be sent to the redirect server site; and obtaining access to a voice or a data communication service after causing the user acceptance to be sent to the redirect server site.

22. A method at a communication device comprising:

connecting with a wireless communication network;

automatically, after connecting with the wireless communication network, sending a request to a predetermined server site external to the wireless communication network;

receiving a response message in response to the request;

comparing a predetermined content with the response message; and determining that the request was not redirected when the predetermined content was found in the response message.

23. The method of claim 22, further comprising: determining that the request was redirected when the predetermined content was not found in the response message.

24. The method of claim 22, wherein the request is sent to a gateway of the wireless communication network.

* * * * *